United States Patent
Bomma et al.

(10) Patent No.: US 11,388,273 B2
(45) Date of Patent: Jul. 12, 2022

(54) ACHIEVING ATOMICITY IN A CHAIN OF MICROSERVICES

(71) Applicant: International Business Machines Corporation, Armonk, NY (US)

(72) Inventors: Shashidhar Bomma, Austin, TX (US); Akash V. Gunjal, Belgaum (IN); Neeraj Kumar Kashyap, Bangalore (IN); Sudheesh S. Kairali, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 16/403,579

(22) Filed: May 5, 2019

(65) Prior Publication Data

US 2020/0351392 A1 Nov. 5, 2020

(51) Int. Cl.
*H04L 69/40* (2022.01)
*G06F 11/20* (2006.01)
*H04L 67/60* (2022.01)

(52) U.S. Cl.
CPC .......... *H04L 69/40* (2013.01); *G06F 11/2023* (2013.01); *H04L 67/32* (2013.01)

(58) Field of Classification Search
CPC . H04L 41/0686; H04L 41/0677; H04L 67/22; H04L 67/306; H04L 67/32; H04L 67/30; H04L 67/04; H04L 67/2833; H04L 67/1097; H04L 67/2809; H04L 67/42; H04L 69/40; G06F 11/2023; G06F 11/1438
See application file for complete search history.

(56) References Cited

U.S. PATENT DOCUMENTS

| 10,362,097 | B1* | 7/2019 | Gupta | H04L 67/10 |
| 2009/0249287 | A1 | 10/2009 | Patrick | |
| 2014/0307632 | A1* | 10/2014 | Kim | H04W 4/70 370/328 |
| 2016/0127254 | A1 | 5/2016 | Kumar | |
| 2016/0269482 | A1 | 9/2016 | Jamjoom | |
| 2016/0294726 | A1 | 10/2016 | Parkinson | |
| 2016/0321296 | A1 | 11/2016 | Kakivaya | |
| 2016/0337474 | A1 | 11/2016 | Rao | |
| 2016/0342548 | A1* | 11/2016 | Hathorn | H04L 67/10 |
| 2016/0380913 | A1 | 12/2016 | Morgan | |

(Continued)

OTHER PUBLICATIONS

"Introduction—Consul by HashiCorp," HashiCorp, Jan. 2019, 10 pages.

(Continued)

*Primary Examiner* — Nicholas R Taylor
*Assistant Examiner* — Kidest Mendaye
(74) *Attorney, Agent, or Firm* — VanLeeuwen & VanLeeuwen; Christopher M. Pignoto

(57) ABSTRACT

An approach is provided in which a microservice fabric controller initiates a call flow that includes a set of transactions through a microservices chain that includes a set of microservices. The microservice fabric controller detects a transaction failure at one of the microservices that is positioned in the microservices chain subsequent to at least one successful microservice. In turn, the microservice fabric controller retries the transaction on the failed microservice without disrupting the previously successful microservice.

17 Claims, 9 Drawing Sheets

(56) References Cited

U.S. PATENT DOCUMENTS

| | | | |
|---|---|---|---|
| 2017/0278100 A1 | 9/2017 | Kraemer | |
| 2018/0270107 A1* | 9/2018 | Nassar | H04L 41/0677 |
| 2018/0307514 A1* | 10/2018 | Koutyrine | G06F 11/0706 |
| 2019/0124504 A1* | 4/2019 | Tran | H04W 8/183 |
| 2019/0213326 A1* | 7/2019 | Dykes | G06F 21/552 |
| 2019/0347168 A1* | 11/2019 | Giannetti | G06F 11/1438 |
| 2020/0026624 A1* | 1/2020 | Parthasarathy | G06F 11/1471 |
| 2020/0092404 A1* | 3/2020 | Wagman | H04L 69/40 |
| 2020/0110667 A1* | 4/2020 | Al-Alem | G06F 11/1438 |
| 2020/0120000 A1* | 4/2020 | Parthasarathy | H04L 67/1097 |
| 2020/0162578 A1* | 5/2020 | Appajanna | H04L 67/32 |
| 2020/0241944 A1* | 7/2020 | Derdak | G06F 9/547 |

OTHER PUBLICATIONS

"Netflix Conductor: A microservices orchestrator," Netflix Technology Blog, Dec. 2016, 14 pages.

Rothert, "Amalgam8: An integration fabric for microservices in the cloud," International Business Machines Corporation, Jun. 2016, 10 pages.

* cited by examiner

Operation Definition 400

420 — TO MICROSERVICE

| OP-1 | Entry Point | MS-A | MS-B | MS-C | MS-D |
|---|---|---|---|---|---|
| Entry Point | | tx-0 | | | |
| MS-A | | | tx-1 | | |
| MS-B | | | | tx-2 | |
| MS-C | | | | | tx-3 |
| MS-D | | | | | |

410 — FROM MICROSERVICE

Operation Definition 430

450 — TO MICROSERVICE

| OP-2 | Entry Point | MS-A | MS-B | MS-C | MS-D |
|---|---|---|---|---|---|
| Entry Point | | | | | tx-0 |
| MS-A | | | | tx-3 | |
| MS-B | | tx-2 | | | |
| MS-C | | | | | |
| MS-D | | | tx-1 | | |

440 — FROM MICROSERVICE

| HISTORICAL FAILURE RATE TABLE | | | | |
|---|---|---|---|---|
| OP-ID | TX-ID | MS | Failure Rate | Retry Failure Rate |
| op1 | tx-1 | ms1 | 50% | 0% |
| op1 | tx-2 | ms2 | 20% | 70% |
| op1 | tx-3 | ms3 | 75% | 50% |

ACHIEVING ATOMICITY IN A CHAIN OF MICROSERVICES

BACKGROUND

Microservice fabrics allow faster development, more control, and better resiliency of microservices without impacting existing implementation code. Microservice fabrics allow developers to avoid the tedious task of connecting the microservices, and instead allows the developers to focus on application logic and advanced Development/Operations (DevOps) capabilities such as systematic resiliency testing, red/black deployment, and canary testing necessary for rapid experimentations and insight.

Current microservice fabric controllers are not equipped to ensure atomicity of a call that spans over a chain of microservices that is deployed by the same fabric controller. In a microservices chain (A, B, C), each microservice is a fully qualified microservices to ensure the atomicity of each of its individual operations. However, a call that begins at microservice A and then proceeds to microservice B and then to microservice C, current microservice fabric controllers do not ensure the atomicity of the operation as a whole.

Individual applications or a caller is typically responsible to ensure cleanup across a chain of microservices. Current microservice fabric controllers are not able to determine whether a chain of microservices is behaving as designed, let alone be able to measure corresponding success/failure metrics such as 'resume-failure-rate', etc. in order to understand and predict trends.

For purposes of this document, "microservices" is hereby defined to include any services that are commonly denominated as microservices, and also to include traditional services (service oriented architecture (SOA) services).

BRIEF SUMMARY

According to one embodiment of the present disclosure, an approach is provided in which a microservice fabric controller initiates a call flow that includes a set of transactions through a microservices chain that includes a set of microservices. The microservice fabric controller detects a transaction failure at one of the microservices that is positioned in the microservices chain subsequent to at least one successful microservice. In turn, the microservice fabric controller retries the transaction on the failed microservice without disrupting the previously successful microservice.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) initiating, by a microservice fabric controller, a call flow comprising a plurality of transactions through a microservices chain comprising a plurality of microservices; (ii) detecting, by the microservice fabric controller, a transaction failure of a selected one of the plurality of transactions at a selected one of the plurality of microservices, wherein the selected microservice is positioned in the microservices chain subsequent to at least one successful microservice; and (iii) retrying, by the microservice fabric controller, the selected transaction on the selected microservice without disrupting the at least one successful microservice.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is an exemplary diagram depicting operation definitions of operations that invoke a chain of microservices;

FIG. 9 is an exemplary diagram depicting historical failure rates of individual microservices.

DETAILED DESCRIPTION

Figure 1:
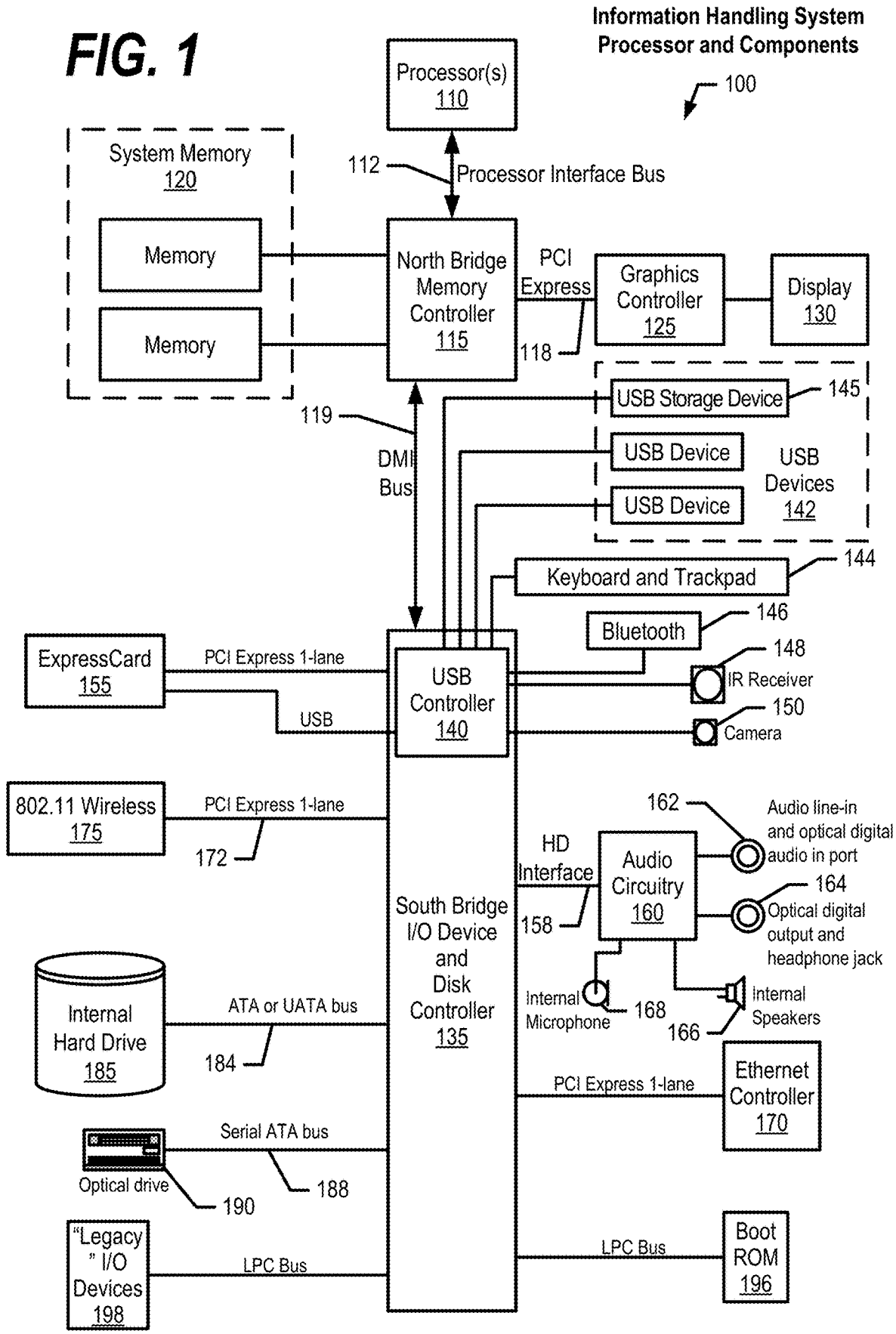
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
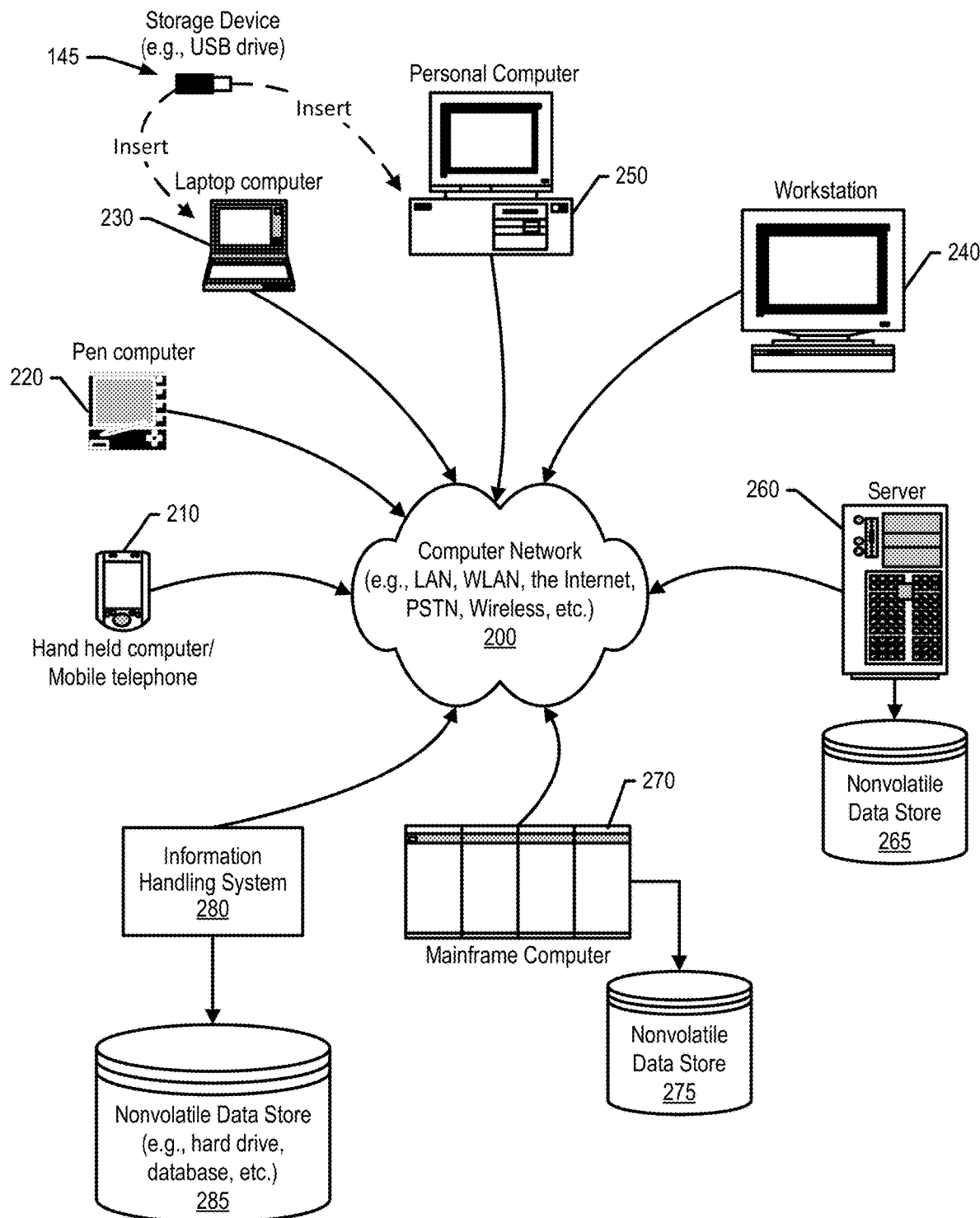
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 9 depict an approach by an information handling system that uses an atomicity agent to collaborate with microservices through sidecars to monitor call flow between a chain of microservices (also referred to herein as a microservices chain) and facilitate the enforcement of atomicity across the microservices chain. A sidecar is an application that is deployed alongside a microservice as a second process and provides platform infrastructure features exposed via a homogeneous interface. When the atomicity agent detects a transaction failure at one of the microservices via a sidecar, the atomicity agent attempts to retry the transaction at the failed microservice and, if the retry fails, the atomicity agent rolls back successful microservices prior to the failure at prior microservices of the chain. As defined herein, a successful microservice is a microservice that successfully completed its task in response to receiving a transaction from the atomicity agent.

Figure 3:
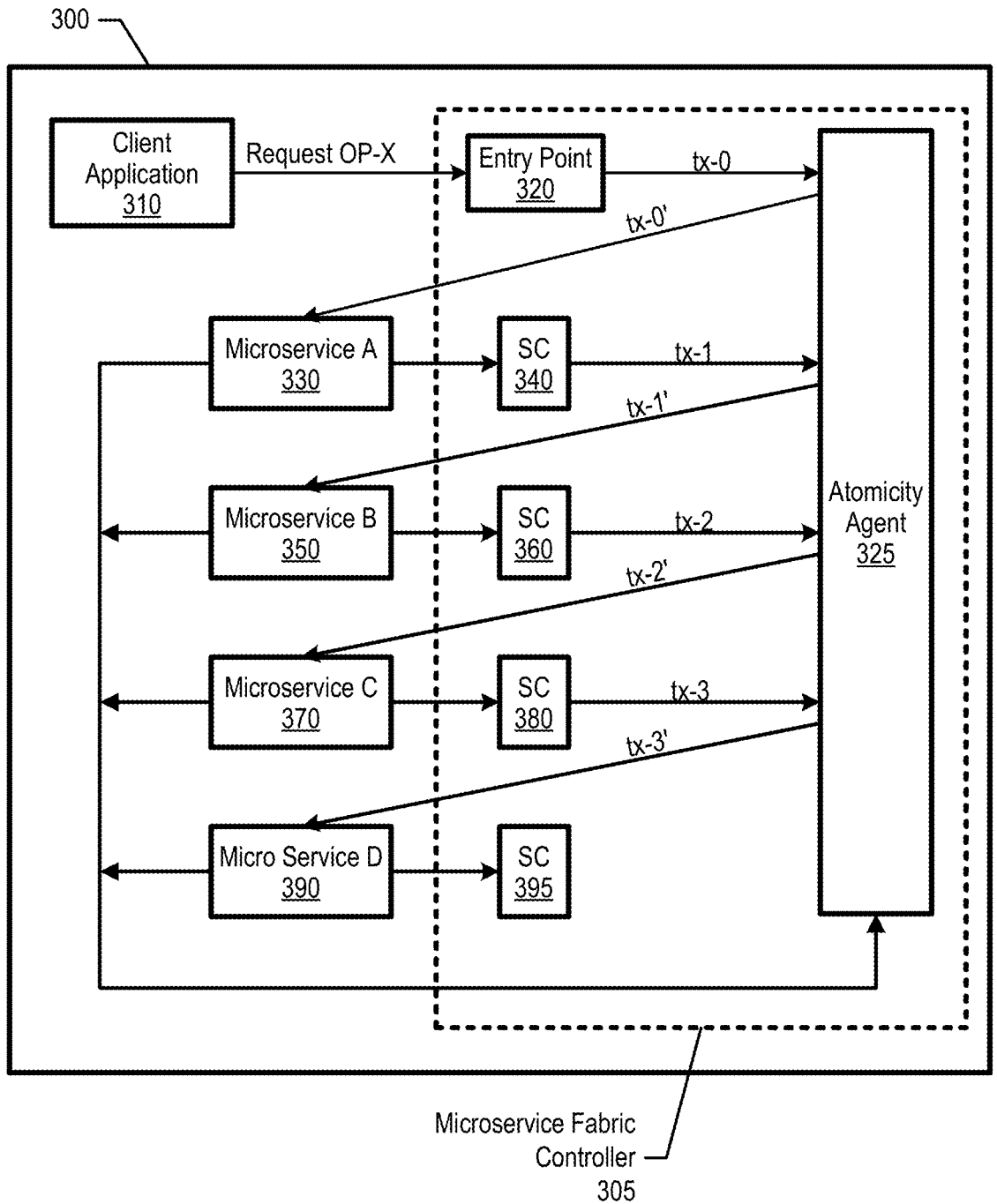
FIG. 3 is an exemplary diagram depicting an atomicity agent that collaborates with a microservice fabric through sidecars to monitor call flow between a microservices chain and facilitates the enforcement of atomicity across the microservices chain.

FIG. 3 is an exemplary diagram depicting an atomicity agent that collaborates with a microservice fabric through sidecars to monitor call flow between a microservices chain and facilitates the enforcement of atomicity across the microservices chain. System 300 includes atomicity agent 325 within microservice fabric controller 305 that monitors transactions between microservices to ensure that the call flow proceeds through the entire microservices chain A 330, B 350, C 370, and D 390. In one embodiment, atomicity agent 325 monitors the calls and, when a failure occurs, atomicity agent 325 retries the calls and then reverts back the state of one or more microservices as discussed herein if the retries fail.

Each of microservices 330-390 provides a well-defined service and exposes a set of Representational State Transfer application program interfaces (REST APIs) that are identified by a microservice-name/microservice-id. The chain of microservices 330-390 collaborates to provide a well-defined service to a requester (client application 310). The microservices chain includes (i) an ordered list of incoming REST API request calls from one microservice to a another microservice; and (ii) an ordered list of outgoing REST API request calls to another microservice (see FIGS. 4, 7, and corresponding text for further details).

System 300 initializes atomicity agent 325 and loads information pertaining to the chain of microservices 330-390 (see FIG. 4 and corresponding text for further details). Then, client application 310 sends request OP-X to entry point 320. As described herein, an operation corresponds an entry point that client application 310 sends a REST API request to invoke a service, which leads to further REST API calls as defined in the microservices chain. The operation is identified by OP-ID (Request OP-X) and is tagged as 'atomic' by client application 310.

Entry point 320 receives Request OP-X and sends transaction tx-0 to atomicity agent 325. As described herein, a transaction is a set of REST calls between atomicity agent 325 and a microservice that is triggered in response to an operation request received by entry point 320 (identified by "tx-id"). In one embodiment, the tx-id is inserted into an HTTP header (or in the payload) of the incoming request (by the sidecar) and each microservice forwards the tx-id to the next microservices in the chain (via HTTP header or in the payload). As such, atomicity agent 325 is able to track the transaction as it flows through a predefined microservices chain.

Atomicity agent 325 receives tx-0 and accesses an operation definition corresponding to OP-X (see FIG. 4 and corresponding text for further details). Atomicity agent 325 determines that the first link in the microservices chain is a call to microservice A 330. As such, atomicity agent 325 sends tx-0' to microservice A 330. Microservice A 330 successfully performs the action and provides information to sidecar 340. In turn, atomicity agent 325 calls viewStatus( ) to sidecar 340 and sidecar 340 sends status tx-1 to atomicity agent 325 accordingly.

Next, atomicity agent 325 determines that the next microservice in the microservices chain is microservice B 350 based on the operation definition of OP-X and sends transaction tx-1' to microservice B 350. Microservice B 350 successfully performs the action and provides information to sidecar 360. In turn, sidecar 360 sends status tx-2 to atomicity agent 325 when requested by atomicity agent 325 via a viewStatus( ) inquiry.

Next, atomicity agent 325 determines that the next microservice in the microservices chain is microservice C 370 based on the operation definition of OP-X and sends transaction tx-2' to microservice C 370. Microservice C 370 successfully performs the action and provides information to sidecar 380. In turn, sidecar 380 sends status tx-3 to atomicity agent 325 when requested by atomicity agent 325 via a viewStatus( ) inquiry.

Atomicity agent 325 then determines that the next microservice in the microservices chain is microservice D 390 based on the operation definition of OP-X and sends transaction tx-3' to microservice D 390. Microservice D 390 successfully performs the action and completes the microservices chain. In one embodiment, if a user extends the microservice chain by adding a new microservice to microservice D 390, sidecar 395 captures the results and interfaces with atomicity agent 325 accordingly.

As discussed below, atomicity agent 325 detects a call flow break in the microservices chain, atomicity agent 325 attempts a local retry of the failed microservice or performs a rollback on each of the previously successful microservices within the microservices chain (see FIGS. 5, 6, and corresponding text for further details).

In one embodiment, atomicity agent 325 tracks historical transaction data and computes metrics such as failure rates, resume failure rates, etc. (see FIG. 9 and corresponding text for further details). In this embodiment, atomicity agent 325 uses the historical data to gain insights about seasonality, recommended-retry-count, etc. For example, if a particular microservice has a low local retry success, atomicity agent 325 may skip steps of a local retry and proceed straight to the rollback steps of the microservices chain.

In another embodiment, atomicity agent 325 monitors traffic for each individual microservice and forms steps to ensure that the microservices chain is atomic at the end of the chain. In addition, atomicity agent 325 facilitates atomicity when system 300 performs a reboot when the microservices chain are executing.

FIG. 4 is an exemplary diagram depicting operation definitions of operations that invoke a chain of microservices. Operation definition 400 shows links between microservices A, B, C, and D to perform a specific service corresponding to operation 1. Rows 410 represent the "from" microservice and columns 420 represent the "to" microservice. Operation definition 400 shows that when atomicity agent 325 receives transaction tx-0 from entry point 320, atomicity agent 325 sends a transaction call to microservice A 330. When atomicity agent 325 receives transaction tx-1 from microservice A 330, atomicity agent 325 sends a transaction call to microservice B 350. When atomicity agent 325 receives transaction tx-2 from microservice B 350, atomicity agent 325 sends a transaction call to microservice C 370. And, when atomicity agent 325 receives transaction tx-3 from microservice C 370, atomicity agent 325 sends a transaction call to microservice D 390.

Similarly, operation definition 430 shows links between microservices A, B, C, and D to perform a specific service corresponding to operation 2. Rows 440 represent the "from" microservice and columns 450 represent the "to" microservice. Operation definition 430 shows that when atomicity agent 325 receives transaction tx-0 from entry point 320, atomicity agent 325 sends a transaction call to microservice D 390. When atomicity agent 325 receives transaction tx-1 from microservice D 390, atomicity agent 325 sends a transaction call to microservice B 350. When atomicity agent 325 receives transaction tx-2 from microservice B 350, atomicity agent 325 sends a transaction call to microservice A 330. And, when atomicity agent 325 receives transaction tx-3 from microservice A 330, atomicity agent 325 sends a transaction call to microservice C 370.

Figure 5:
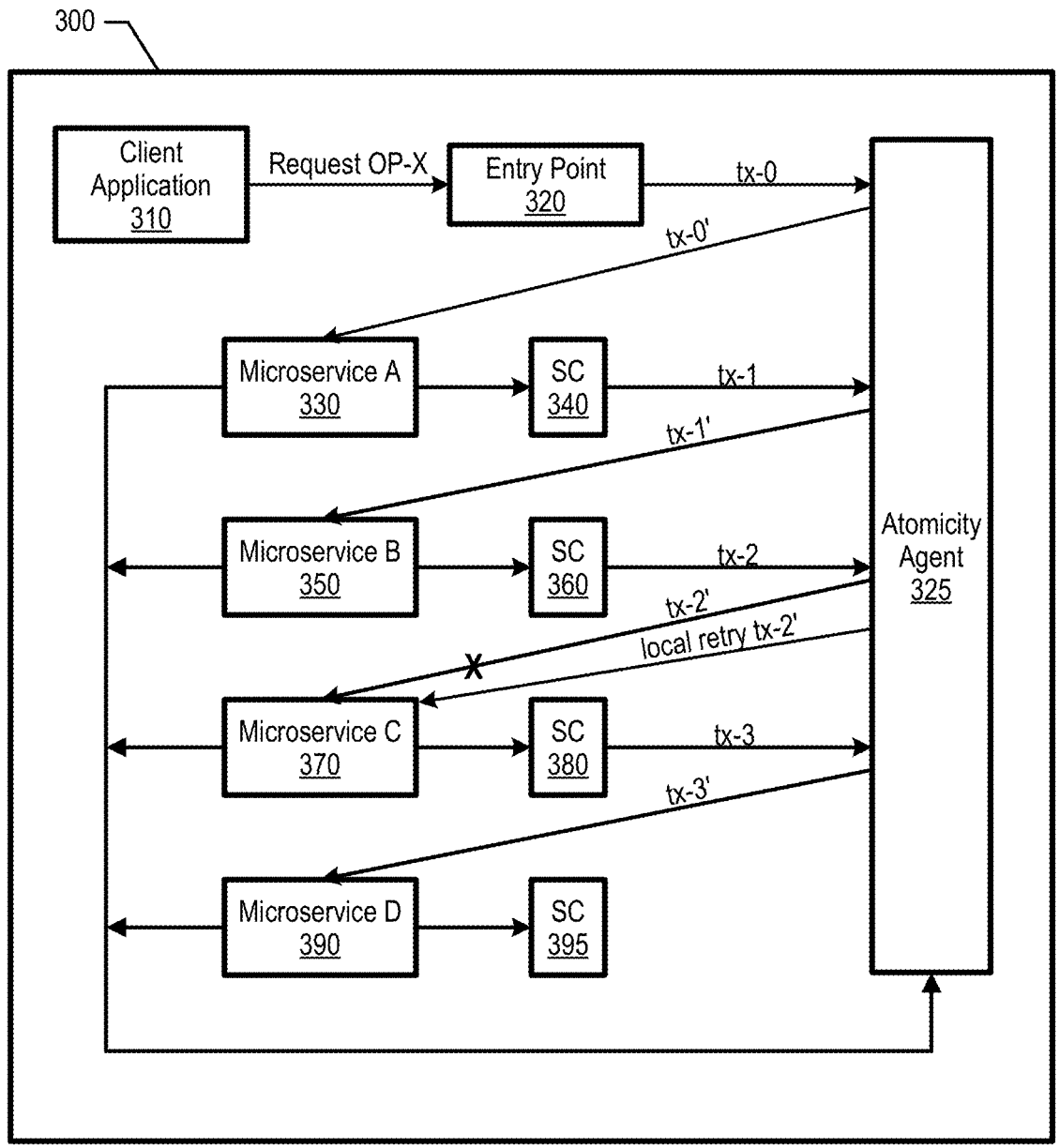
FIG. 5 is an exemplary diagram depicting an atomicity agent performing a local retry of a transaction in response to detecting a transaction failure at a microservice in a microservices chain.

FIG. 5 is an exemplary diagram depicting atomicity agent 325 performing a local retry of a transaction in response to detecting a transaction failure at a microservice in a microservices chain. In one embodiment, a transaction failure can occur from one or more of the following status conditions: hanging, internal-error, unauthorized, resource-not-found, timeout, not-allowed, not-acceptable, and etcetera.

When atomicity agent 325 detects that transaction tx-2' to microservice C 370 fails (via inquiry to sidecar 380), atomicity agent 325 attempts to locally retry the failed transaction for an amount of times. In one embodiment, the amount of times is determined by a using a pre-defined retry count. When the local retry succeeds, atomicity agent 325 continues to support the microservices chain and sends tx-3' to microservice D 390 to complete the microservices chain (see FIG. 3 and corresponding text for further details). In this embodiment, atomicity agent 325 sends the transaction retry to the failed microservice (using the same tx-id) and does not alter the call flow of the previously successful microservices (does not alter the state of previously successful microservices).

Figure 6:
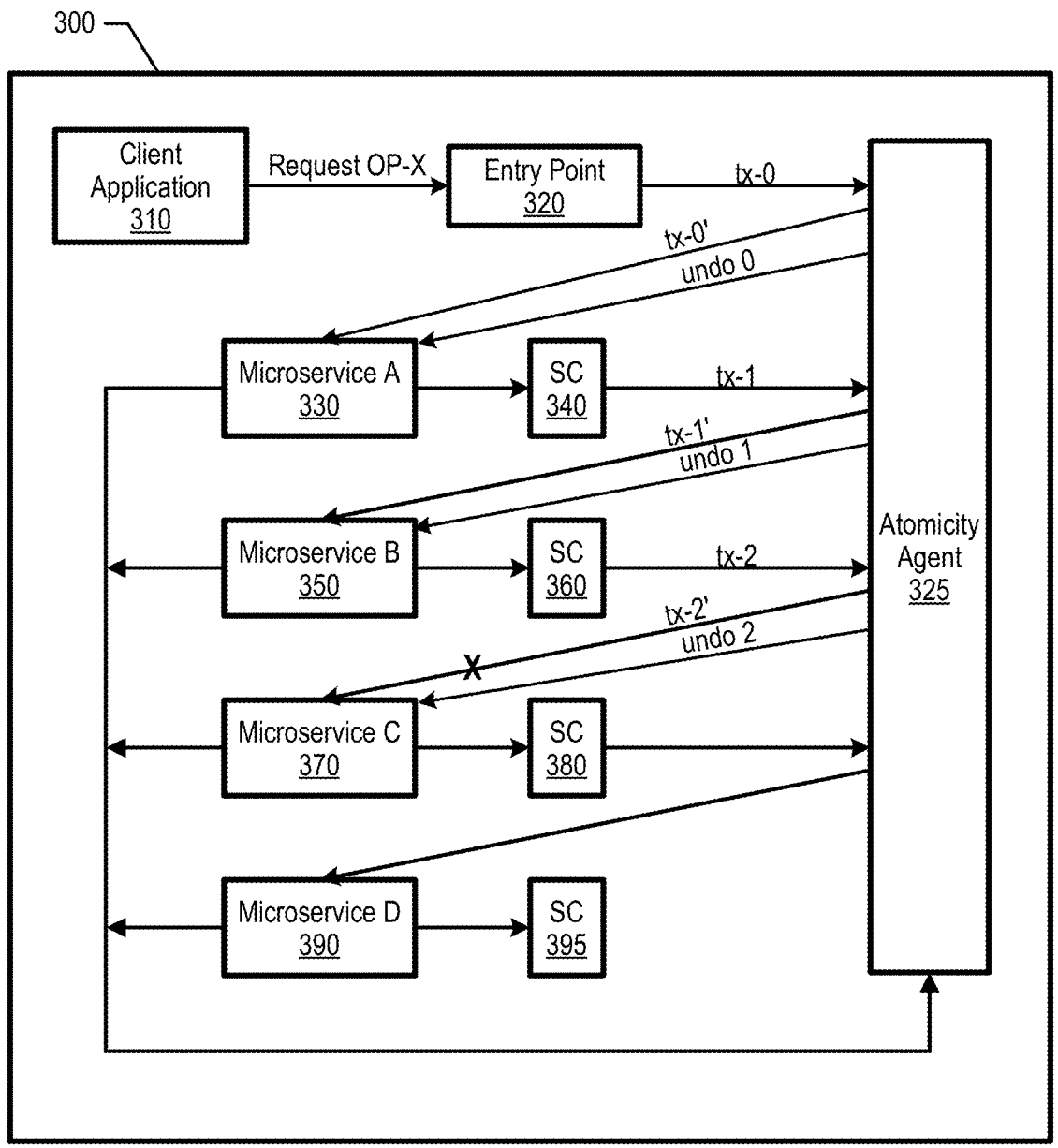
FIG. 6 is an exemplary diagram depicting an atomicity agent performing an operation rollback in response to a transaction failure.

On the other hand, if the failure persists after the allotted amount of local retries, atomicity agent 325 initiates operation rollback steps to roll back actions performed by prior microservices (see FIG. 6 and corresponding text for further details).

FIG. 6 is an exemplary diagram depicting atomicity agent 325 performing an operation rollback in response to a transaction failure. When atomicity agent 325 detects that a local retry is ineffective (see FIG. 5 and corresponding text for further details), or that a particular microservice has a low success probability of a local retry (see FIG. 9 and corresponding text for further details), atomicity agent 325 triggers an operation rollback (rewind) on the microservices chain to rollback (undo) the previously successful actions (state changes) on prior microservices up to the point of failure.

FIG. 6 shows that microservice C 370 fails and atomicity agent 325 sends undo 2 call to microservice C 370 to undo tx-2'. For example, microservice C 370 may have completed five of its ten steps and the undo 2 call rolls back the five completed steps. Atomicity agent 325 also sends undo 1 call to microservice B 350 to undo a successful tx-1' transaction at microservice B 350 (e.g., delete a created volume), and sends undo 0 call to microservice A 330 to undo a successful tx-0' transaction at microservice A 330.

In one embodiment, atomicity agent 325 has access to all the operations of all individual services and scans the entries that are recorded and performs recovery steps. In this embodiment, atomicity agent 325 may re-run the entire microservices chain in certain situations as shown in FIG. 6. In another embodiment, atomicity agent 325 partially reruns the entire microservices chain situations in certain situations (see FIG. 5 and corresponding text for further details).

Figure 7:
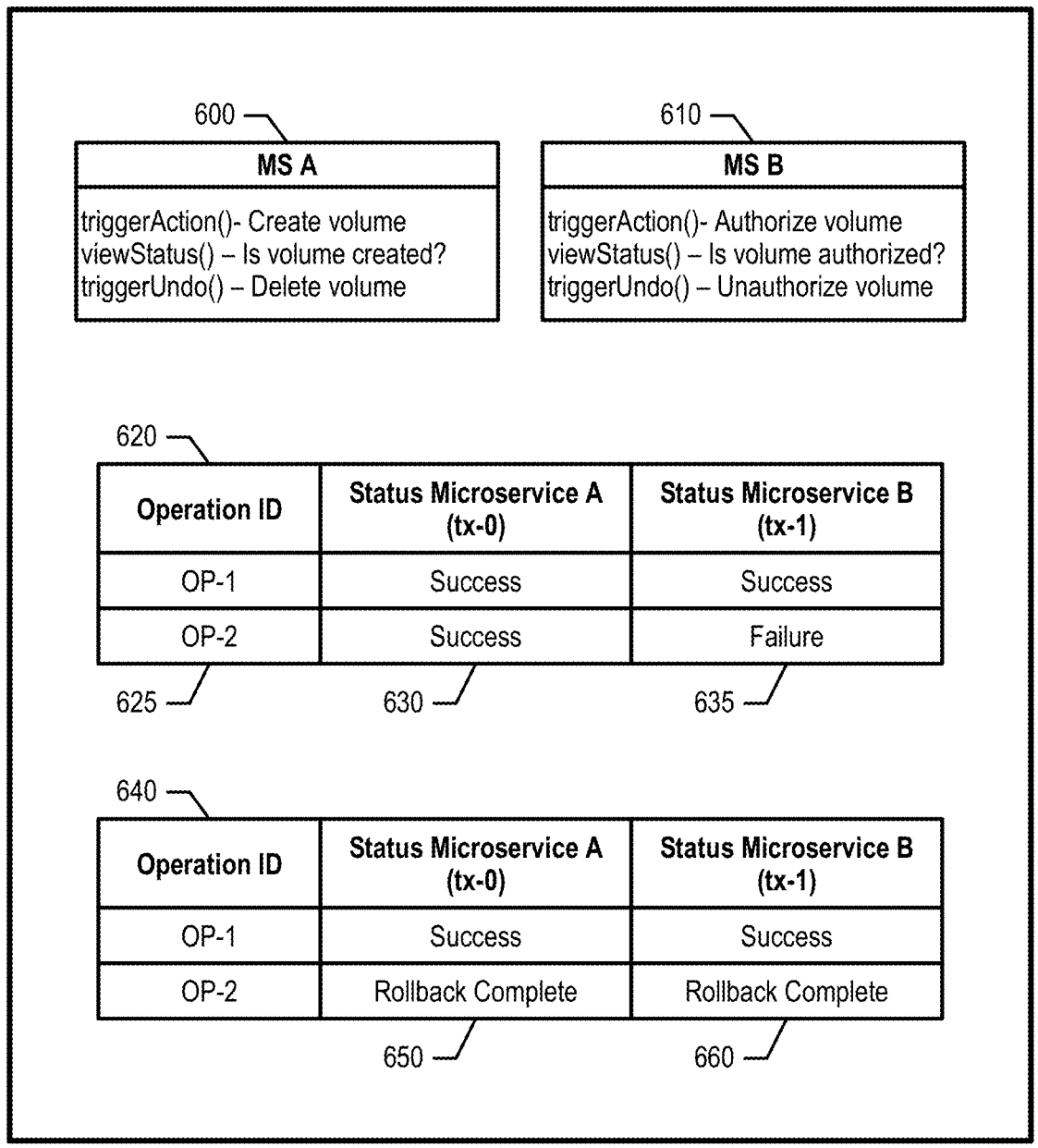
FIG. 7 is an exemplary diagram depicting various API interfaces and status tables.

FIG. 7 is an exemplary diagram depicting various API interfaces and status tables. As part of registering a microservice with atomicity agent 325, each microservice requires an agent interface that complies with policies defined by atomicity agent 325. Interfaces 600 and 610 show an embodiment that includes three inquiry methods:

triggerAction ( )—Calls an implementation in the microservice to perform a required operation.

viewStatus ( )—Checks the status of the action triggered to check whether the action is successful or a failure. Can be implemented as direct call to the microservice or call to a monitoring service (sidecar).

triggerUndo ( )—When the viewStatus reports a failure, this method rolls back any change because of operation performed by the microservices from the point of failure.

Interfaces 600 and 610 correspond to an example of a volume creation and a volume authorization. Microservice A 330 performs the create volume action and microservice B 350 performs the volume authorization action. During operation, atomicity agent 325 logs the progress of operation call flows in table 620 through the various microservices in a microservices chain. Column 625 logs the operations over time. Column 630 logs the transaction results of microservice A 330 for the various operations, and column 635 logs the transaction results of microservice B 350 for the various operations.

In one embodiment, for example, "Usermanagement," "Domainmanagement," and "Taskmanagement" microservices register into a microservices chain with a chain 1 call flow of Usermanagement→Domainmanagement→Taskmanagement. Usermanagement registers the following details with atomicity agent 325:

Operation: CreateUser (username parameter)
Verification API details: ListUser (username parameter)
Chain: Chain 1
Domainmanagement registers the following details with atomicity agent 325:
Operation: AssignDomainToUser (username parameter)
Verification API details: ListDomainOfUser (username parameter)
Chain: Chain 1
Taskmanagement registers the following details with atomicity agent 325:
Operation: AssignTaskToUser (username parameter)
Verification API details: ListTaskOfUser (username parameter)
Chain: Chain 1

Transaction 1 starts chain 1 (username Alfred) and completes. Transaction 2 starts chain 1 (username Jill) and fails at the Domain assignment. As such, atomicity agent 325 stores the following data:

Transaction 1→Chain 1 (Completed (username Alfred))
Transaction 2→Chain 1 (Failed at AssignDomainToUser (username Jill))

Atomicity agent 325 retries the status of the failed operation during the next schedule ListDomainOfUser (username Jill). if the transaction fails, atomicity agent 325 will retry AssignDomainToUser (username Jill) again until it reaches a predefined retry threshold that is configured for the operation.

Table 620 shows that when OP-1 was performed, both microservice A 330 and microservice B 350 were successful. However, when OP-2 is performed, atomicity agent 325 detects a failure status through a viewStatus( ) call to microservice B 350 (or sidecar 360). Based on microservice B 350's failure, atomicity agent 325 may attempt a local retry but eventually determines that an operation rollback is required. As such, atomicity agent 325 rolls back microservice B 350 and microservice A 330. Table 640 (e.g., revised table 620) and corresponding columns 650 and 660 show the status of each microservice after the rollback.

Figure 8:
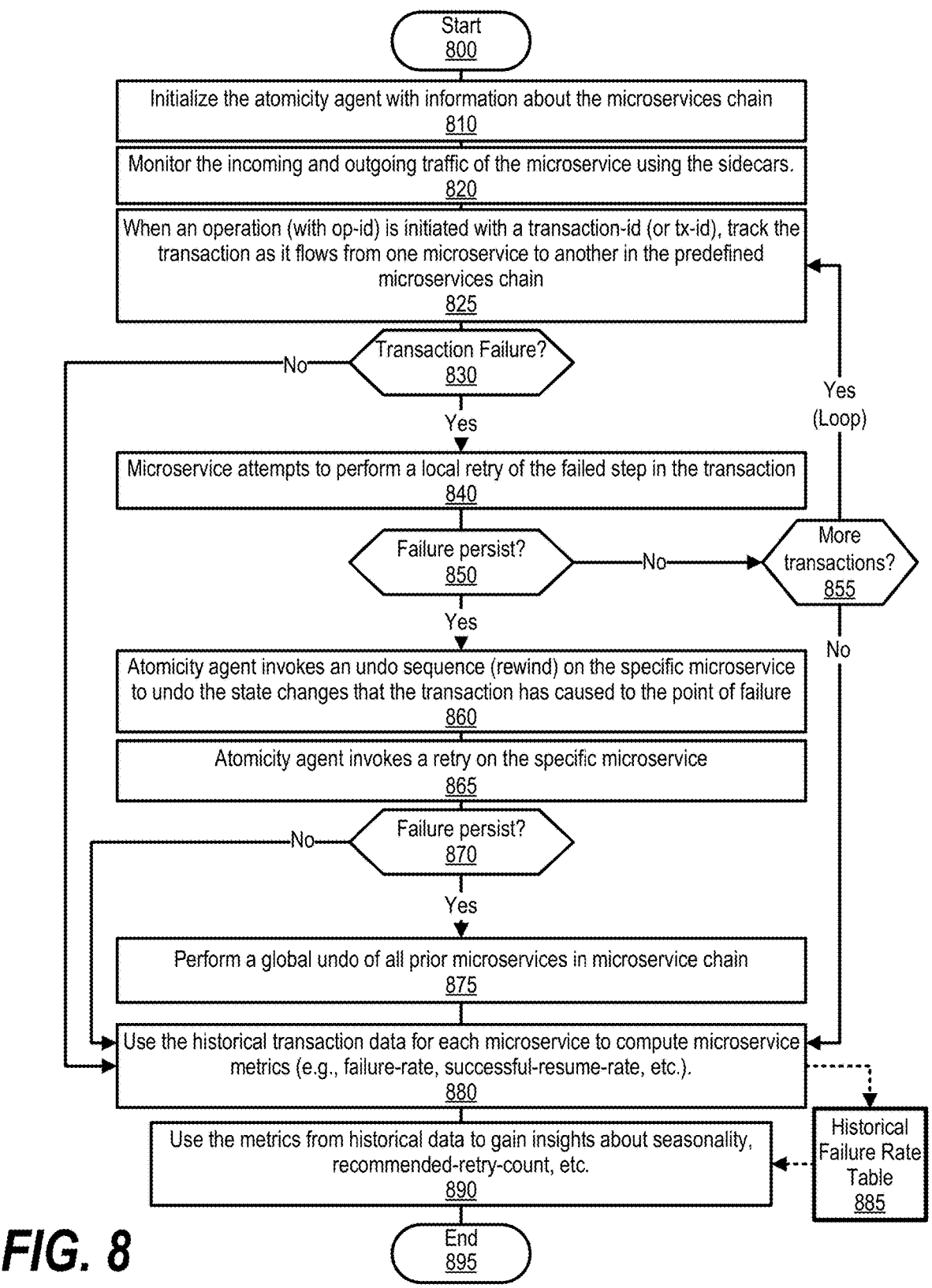
FIG. 8 is an exemplary flowchart showing steps taken to detect failures in a microservices chain and perform corrective actions.

FIG. 8 is an exemplary flowchart showing steps taken to detect failures in a microservices chain and perform corrective actions. FIG. 8 processing commences at 800 whereupon, at step 810, the process initializes the atomicity agent with information about the microservices chain (see FIG. 4 and corresponding text for further details).

At step 820, the process monitors the incoming and outgoing traffic of the microservice via the sidecars (sidecars 340, 360, 380, and 395). At step 825, when an operation (with op-id) is initiated with a transaction-id (or tx-id), the process tracks the transaction as it flows from one microservice to another in the predefined microservices chain.

The process determines as to whether a transaction failure occurred through the microservices chain as discussed herein (decision 830). If a transaction failure did not occur, then decision 830 branches to the 'no' branch. On the other hand, if a transaction failure occurred, decision 830 branches to the 'yes' branch whereupon, at step 840, the microservice attempts to perform a local retry.

The process determines as to whether the specific microservice was able to resolve the transaction failure (decision 850). If the transaction failure is resolved, then decision 850 branches to the 'no' branch whereupon the process determines as to whether there are more transactions in the microservices chain (decision 855). If there are no more transactions, then decision 855 branches to the 'no' branch. On the other hand, if there are more transactions, decision 855 branches to the 'yes' branch that loops back to invoke and track the transaction flows through the rest of the microservices chain.

Referring back to decision 850, if the microservice was not able to independently resolve its transaction failure, then decision 850 branches to the 'yes' branch whereupon, at step 860, the process (atomicity agent 325) invokes an undo sequence (rewind) on the specific microservice to undo the state changes in the microservice that the transaction has caused to the point of failure (see FIG. 5 and corresponding text for further details). In one embodiment, the process attempts multiple retries to achieve a successful transaction up until a pre-defined threshold (e.g., three attempts).

At step 865, the process invokes a retry on the specific microservice without disrupting the call flow as discussed herein. The process determines as to whether the process' retry attempt was successful or whether the failure persists (decision 870). If the retry was successful, then decision 870 branches to the 'no' branch bypassing a global undo sequence at step 875. On the other hand, if the failure persists, decision 870 branches to the 'yes' branch whereupon the process invokes a global undo of all prior microservices in the microservice chain at step 875 (see FIG. 6 and corresponding text for further details).

At step 880, the process uses the historical transaction data for each microservice to compute microservice metrics (e.g., failure-rate, successful-resume-rate, etc.) and stores the metrics in historical failure rate table 885 (see FIG. 9 and corresponding text for further details).

At step 890, the process uses the metrics from historical failure rate table 880 to gain insights about microservice seasonality, recommended-retry-count, etc. In one embodiment, based on insights, if the retry success rate is high for a particular microservice, then atomicity agent 325 attempts a local retry when a failure occurs (step 865). However, if the retry success rate is low for a particular microservice, atomicity agent 325 bypasses the local retry steps and performs an operation rollback (e.g. global undo) at step 875 as the chances of the retry succeeding are less based on the historical data. FIG. 8 processing thereafter ends at 895.

FIG. 9 is an exemplary diagram depicting historical failure rates of individual microservices. Table 885 includes transactions sorted by operation (column 910 OP-ID). The transactions are listed in column 920 with their corresponding microservice in column 930. Atomicity agent 325 tracks the initial failure rates of each transaction (column 940) and their corresponding retry failure rates in column 950. In one embodiment, atomicity agent 325 uses the retry failure rates to determine whether to attempt a local retry. For example, microservice 1 has a 0% success rate on a retry and, therefore, atomicity agent 325 may determine not to attempt a retry when a transaction to microservice 1 fails and instead perform an operation rollback (e.g. global undo).

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

initiating, by a microservice fabric controller, a call flow comprising a plurality of transactions through a microservices chain comprising a plurality of microservices;

detecting, by the microservice fabric controller, a transaction failure of a selected one of the plurality of transactions at a selected one of the plurality of microservices, wherein the selected microservice is positioned in the microservices chain subsequent to at least one successful microservice;

determining whether to perform a retry based on a set of historical data that indicates a retry success rate of the selected microservice;

in response to determining to perform the retry based on the retry success rate, retrying, by the microservice fabric controller, the selected transaction on the selected microservice without disrupting the at least one successful microservice; and in response to determining not to perform the retry based on the retry success rate, performing an undo transaction on each of the at least one successful microservices in the microservices chain to undo at least one state in each of the at least one successful microservices.

2. The method of claim 1 further comprising:
undoing one or more states at the selected microservice caused by the transaction failure prior to the retrying of the selected transaction.

3. The method of claim 1 further comprising:
detecting that the retry of the selected transaction failed;
determining whether an amount of retries of the selected transaction reached a predefined threshold; and
in response to determining that the amount of retries of the selected transaction is below the predefined threshold, performing another retry of the selected transaction on the selected microservice.

4. The method of claim 3 further comprising:
in response to detecting that the amount of retries of the selected transaction reaches the predefined threshold, performing the undo transaction on each of the at least one successful microservices in the microservices chain to undo at least one state in each of the at least one successful microservices.

5. The method of claim 1 further comprising:
prior to initiating the call flow, generating an operation definition that links the plurality of microservices in the microservices chain; and
performing the call flow based on the operation definition in response to matching a received service request to the operation definition.

6. The method of claim 1 wherein the microservice fabric controller utilizes a set of application sidecars to capture status of the plurality of microservices.

7. An information handling system comprising:
one or more processors;
a memory coupled to at least one of the processors;
a set of computer program instructions stored in the memory and executed by at least one of the processors in order to perform actions of:
  initiating, by a microservice fabric controller, a call flow comprising a plurality of transactions through a microservices chain comprising a plurality of microservices;
  detecting, by the microservice fabric controller, a transaction failure of a selected one of the plurality of transactions at a selected one of the plurality of microservices, wherein the selected microservice is positioned in the microservices chain subsequent to at least one successful microservice;
  determining whether to perform a retry based on a set of historical data that indicates a retry success rate of the selected microservice;
  in response to determining to perform the retry based on the retry success rate, retrying, by the microservice fabric controller, the selected transaction on the selected microservice without disrupting the at least one successful microservice; and
  in response to determining not to perform the retry based on the retry success rate, performing an undo transaction on each of the at least one successful microservices in the microservices chain to undo at least one state in each of the at least one successful microservices.

8. The information handling system of claim 7 wherein the processors perform additional actions comprising:
undoing one or more states at the selected microservice caused by the transaction failure prior to the retrying of the selected transaction.

9. The information handling system of claim 7 wherein the processors perform additional actions comprising:
detecting that the retry of the selected transaction failed;
determining whether an amount of retries of the selected transaction reached a predefined threshold; and
in response to determining that the amount of retries of the selected transaction is below the predefined threshold, performing another retry of the selected transaction on the selected microservice.

10. The information handling system of claim 9 wherein the processors perform additional actions comprising:
in response to detecting that the amount of retries of the selected transaction reaches the predefined threshold, performing the undo transaction on each of the at least one successful microservices in the microservices chain to undo at least one state in each of the at least one successful microservices.

11. The information handling system of claim 7 wherein the processors perform additional actions comprising:
prior to initiating the call flow, generating an operation definition that links the plurality of microservices in the microservices chain; and
performing the call flow based on the operation definition in response to matching a received service request to the operation definition.

12. The information handling system of claim 7 wherein the microservice fabric controller utilizes a set of application sidecars to capture status of the plurality of microservices.

13. A computer program product stored in a computer readable storage medium, comprising computer program code that, when executed by an information handling system, causes the information handling system to perform actions comprising:
initiating, by a microservice fabric controller, a call flow comprising a plurality of transactions through a microservices chain comprising a plurality of microservices;
detecting, by the microservice fabric controller, a transaction failure of a selected one of the plurality of transactions at a selected one of the plurality of microservices, wherein the selected microservice is positioned in the microservices chain subsequent to at least one successful microservice;
determining whether to perform a retry based on a set of historical data that indicates a retry success rate of the selected microservice;
in response to determining to perform the retry based on the retry success rate, retrying, by the microservice fabric controller, the selected transaction on the selected microservice without disrupting the at least one successful microservice; and
in response to determining not to perform the retry based on the retry success rate, performing an undo transaction on each of the at least one successful microservices in the microservices chain to undo at least one state in each of the at least one successful microservices.

14. The computer program product of claim 13 wherein the information handling system performs further actions comprising:
undoing one or more states at the selected microservice caused by the transaction failure prior to the retrying of the selected transaction.

15. The computer program product of claim 13 wherein the information handling system performs further actions comprising:

detecting that the retry of the selected transaction failed;

determining whether an amount of retries of the selected transaction reached a predefined threshold; and in response to determining that the amount of retries of the selected transaction is below the predefined threshold, performing another retry of the selected transaction on the selected microservice.

16. The computer program product of claim 15 wherein the information handling system performs further actions comprising:

in response to detecting that the amount of retries of the selected transaction reaches the predefined threshold, performing the undo transaction on each of the at least one successful microservices in the microservices chain to undo at least one state in each of the at least one successful microservices.

17. The computer program product of claim 13 wherein the information handling system performs further actions comprising:

prior to initiating the call flow, generating an operation definition that links the plurality of microservices in the microservices chain; and performing the call flow based on the operation definition in response to matching a received service request to the operation definition.

\* \* \* \* \*